Aug. 25, 1931.    S. E. MORRAL    1,820,363
TRANSMISSION MECHANISM
Filed Sept. 4, 1928    3 Sheets-Sheet 1

INVENTOR.
SAMUEL E. MORRAL
ATTORNEY.

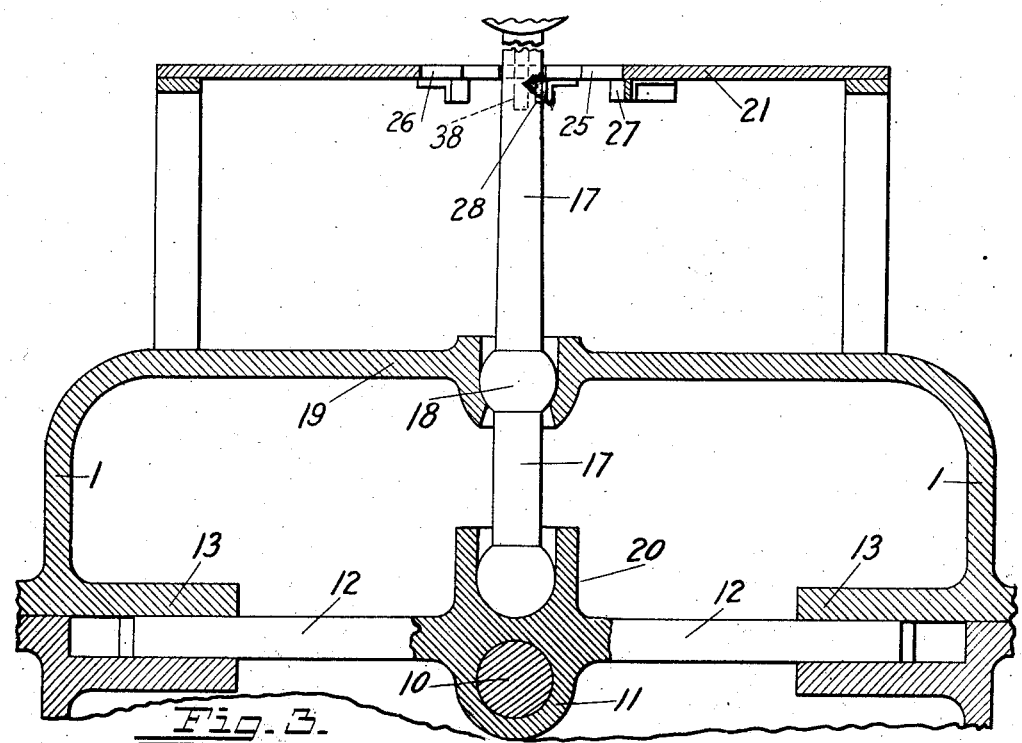
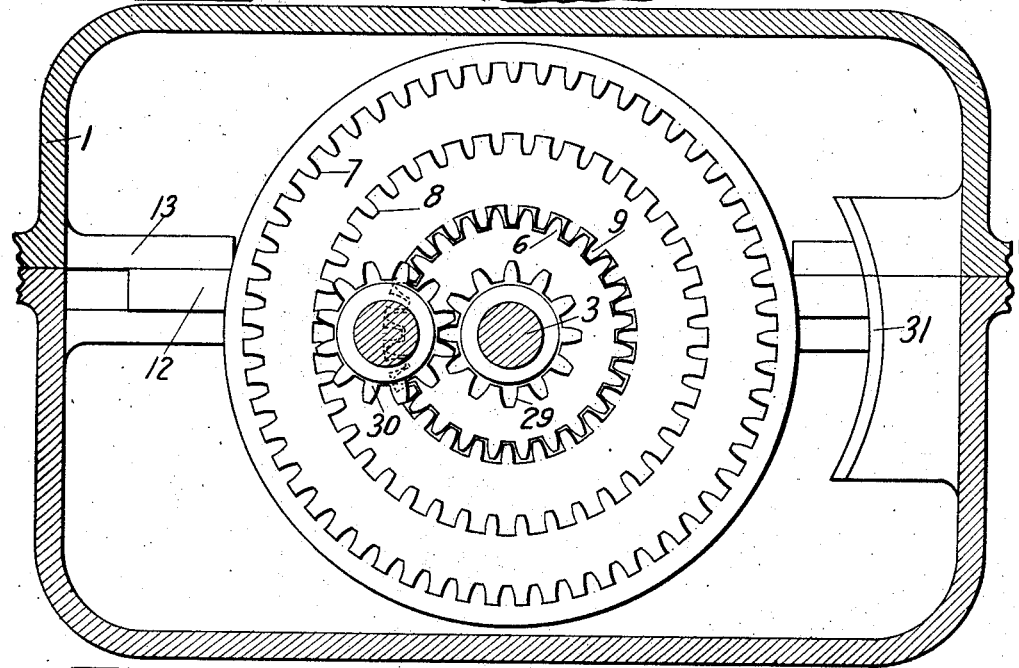

Aug. 25, 1931. S. E. MORRAL 1,820,363
TRANSMISSION MECHANISM
Filed Sept. 4, 1928 3 Sheets-Sheet 3

INVENTOR.
SAMUEL E. MORRAL
ATTORNEY.

Patented Aug. 25, 1931

1,820,363

UNITED STATES PATENT OFFICE

SAMUEL E. MORRAL, OF MORRAL, OHIO

TRANSMISSION MECHANISM

Application filed September 4, 1928. Serial No. 303,683.

This invention relates to transmission mechanisms and is designed more particularly for use on automobiles and the like.

One object of the invention is to provide a simple efficient and easily operated mechanism whereby movement may be transmitted from a driving shaft to a driven shaft at variable speeds.

A further object of the invention is to provide such a mechanism including a direct connection between the driving shaft and the driven shaft and means for transmitting movement from the driving shaft to the driven shaft at a speed in excess of that provided by the direct connection.

A further object of the invention is to provide a transmission mechanism in which a gear unit will be movable both axially and transversely to cause selected gears to be brought into operative relation to a driving gear.

A further object of the invention is to provide such a transmission mechanism in which a portion of the gear unit will constitute a brake drum.

Other objects of the invention will appear as the mechanism is described in detail.

Figure 1:
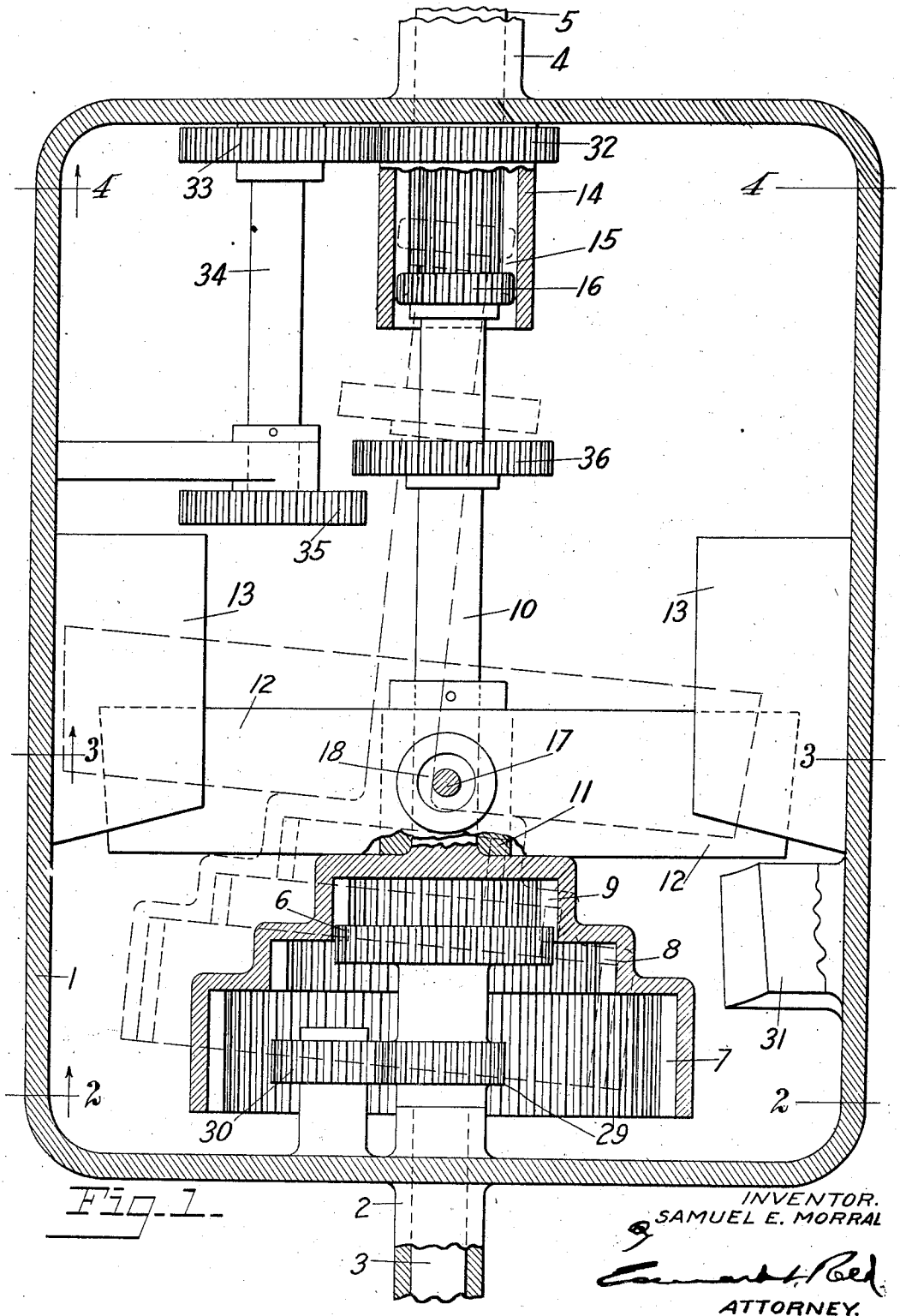
Figure 5:
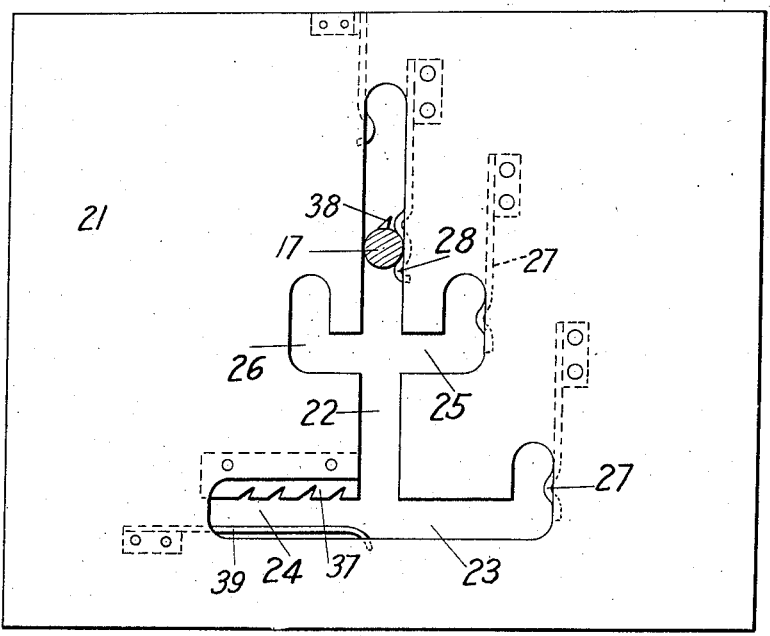
Figure 4:
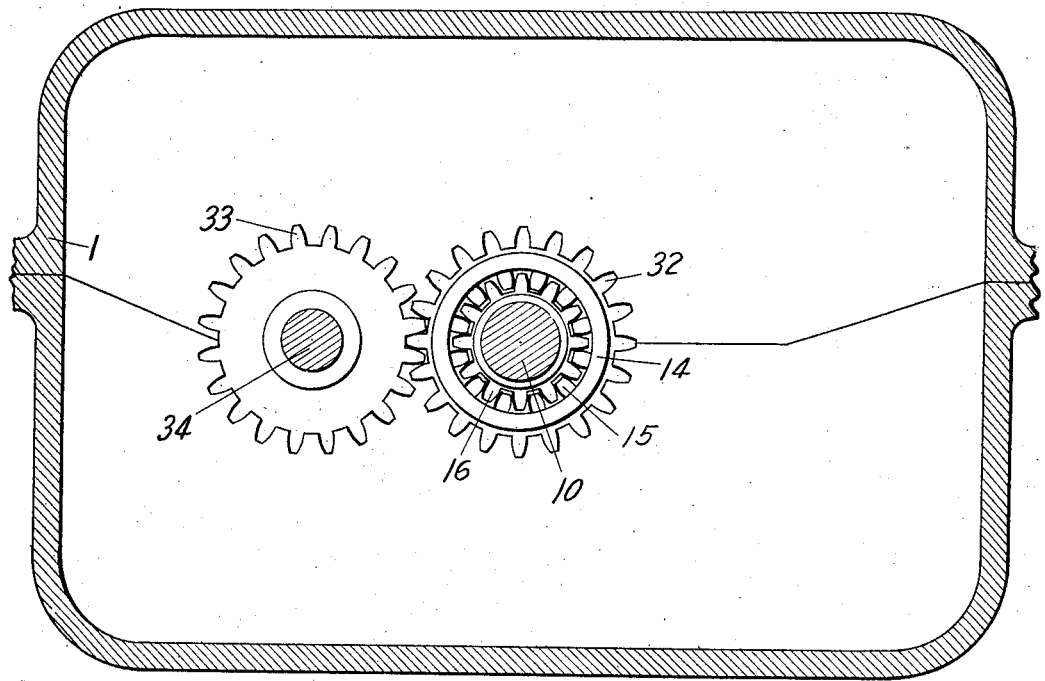

In the accompanying drawings Fig. 1 is a top plan view, partly in section, of a transmission mechanism embodying my invention, with the top of the housing removed; Fig. 2 is a transverse section taken on the line 2—2 of Fig. 1; Fig. 3 is a transverse section taken on the line 3—3 of Fig. 1; Fig. 4 is a transverse section taken on the line 4—4 of Fig. 1; and Fig. 5 is a plan view of the guide plate for the operating lever.

In these drawings I have illustrated one embodiment of my invention but it will be understood that this particular embodiment has been chosen for the purposes of illustration only and that the mechanism may take various forms without departing from the spirit of the invention.

The particular mechanism here illustrated is mounted within a housing 1 which may be rigidly secured to the automobile in any suitable manner. At its forward end this housing is provided with a bearing 2 in which is journaled a driving shaft 3, which may be the shaft of an automobile engine. At its rear end the housing is provided with a bearing 4 in which is journaled a driven shaft 5, which may be connected with and drive the wheels of the automobile. The driving shaft 3 extends for a short distance into the forward end of the housing and has rigidly secured thereto a spur gear 6 which constitutes the driving gear of the transmission mechanism. Associated with this spur gear is an internal gear unit having a plurality of toothed portions of different diameters, as shown at 7, 8 and 9. In the present instance, the internal gear unit is formed in a single piece of stepped formation. This gear unit is mounted for both axial and transverse movement, the longitudinal movement serving to bring a selected one of the toothed portions 7, 8 and 9, into line with the spur gear 6. When either the part 7 or 8 of the gear unit is in line with the spur gear the transverse movement thereof will bring the teeth of that portion into mesh with the spur gear. The toothed portion 9, while in the form of a gear, constitutes in effect a clutch member and it is brought into clutching engagement with the spur gear 6 by the axial movement of the gear unit, thus establishing a direct connection between the driving shaft 3 and the driven shaft with which the gear unit is connected.

The gear unit may be supported and actuated in any suitable manner but, as here shown, it is rigidly secured to an intermediate shaft 10 which is journaled in a bearing 11 on an adjustable supporting structure 12. In the present instance, this supporting structure is in the form of a plate the ends of which extend into longitudinal guideways 13 in which the plate may have both a longitudinal movement and a transverse movement. The intermediate shaft 10 is connected at its rear end with the driven shaft 5 in such a manner that the connection will be maintained when the shaft is moved axially to bring a selected one of the toothed portions of the gear unit into line with the driving gear. As here shown, the driven shaft has rigidly secured thereto, within the housing 1, a tubular member or casing 14 provided internally with a series of longitudinally extending ribs or elongated gear teeth 15. The rear end of the intermediate shaft 10 extends normally into the tubular member 14 and has rigidly secured thereto a gear 16 which meshes throughout its circumference with the teeth of the tubular member, thus constituting a slidable clutch connection between the shaft 10 and the shaft 5. The gear 16 is relatively thin and is so shaped that it may have not only sliding movement within the tubular member but may be moved about a transverse axis with relation to the tubular member, thus permitting the intermediate shaft and the internal gear unit to have lateral swinging movement with relation to the driven shaft.

Operative movement may be imparted to the gear unit, to bring the different parts thereof into operative relation with the driving gear, in any suitable manner but I prefer to employ a single actuating device for imparting both movements thereto. In the present device, these movements are imparted to the gear unit through the supporting structure 12 by means of a lever 17 pivotally mounted, by means of a ball and socket connection 18, on the cover 19 of the housing 1 and having at its lower end a ball and socket connection, as shown at 20, with the supporting structure 12. The upper portion of the lever 17 extends through a guide plate 21 supported above the top or cover of the housing and having a main longitudinal guide slot 22 which communicates at its front end with a transverse slot 23 and a transverse slot 24 and which also communicates at points between its ends with a transverse slot 25 and a transverse slot 26. The transverse slots 23, 25 and 26, have rearwardly extending portions at their outer ends. It will be apparent that the forward movement of the lever 17 in the longitudinal guide slot 22 will impart a rearward movement to the supporting structure 12 and the internal gear unit, the arrangement being such that when the lever is brought into line with the transverse slot 23 the largest toothed portion, or low speed gear, of the gear unit will be in line with the spur gear 6. By then moving the lever into the transverse slot 23 the gear unit will be moved transversely to cause the toothed portion 7 thereof to mesh with the spur gear 6. A slight rearward movement of the lever will carry the same into the rearwardly extending portion of the slot 23, in which it will be held by a yieldable detent 27, thus maintaining the connection between the gear unit and the spur gear. When the lever is moved into line with the transverse slot 25 the toothed portion 8 of the gear unit will be in line with the spur gear and may be moved into mesh therewith by moving the lever into the transverse slot 25. The movement of the lever 17 to a position between the transverse slot 25 and the rear end of the longitudinal slot 22 will move the toothed portion or clutch member 9 of the gear unit into engagement with the spur gear 6, thus establishing a direct connection between the driving shaft and the driven shaft. A yieldable retaining device 28 serves to retain the lever in its position and to hold the same against movement in either direction.

Rigidly secured to the driving shaft 3 is a second gear 29 which is in constant mesh with an idle gear 30 adapted to be engaged by the toothed portion 7 of the gear unit, and thus impart reverse movement to the driven shaft. The portion 7 of the gear unit is of such a width that it will remain in line with the idle gear 30 when the part 8 thereof is in line with the spur gear 6 and by moving the lever 17 into the transverse slot 26 the part 7 of the gear unit may be caused to engage the idle gear 30. The movement necessary to cause this engagement is not sufficient to cause the toothed portion 8 to engage the spur gear.

The outer surface of the part 7 of the gear unit may be utilized as a brake drum to hold the driven shaft against rotation. To this end I have mounted within the housing a brake shoe 31 so arranged that when the part 7 is in line with the spur gear 6 it will also be in line with the brake shoe. By then moving the lever 17 into the transverse slot 24 the outer surface of the gear unit will be brought into frictional contact with the brake shoe, thus enabling the device to be used as a parking brake. The gear unit may be held in contact with the brake shoe in any suitable manner. As here shown, a toothed rack 37 is secured to the plate 21 along the rear edge of the slot 24 and is adapted to be engaged by a tooth or projection 38 on the lever 17. A spring 39 arranged along the forward edge of the slot 24 yieldably retains the tooth in contact with the rack and permits it to be disengaged therefrom by a forward pressure on the lever. Preferably the rack 37 and tooth 38 are arranged below the level of the plate 21 so that the tooth will not interfere with the movement of the rack in the other slots.

It is sometimes desirable to operate the driven shaft 5 at a speed in excess of that provided by the direct connection between the same and the driven shaft. To provide such an over-speed I have provided means whereby the normal connection between the intermediate shaft 10 and the driven shaft 5 may be interrupted and the intermediate shaft connected with the gear shaft through multiplying gearing. As here shown, I have rigidly secured to the driven shaft 5, within the housing 1, a gear 32 which is in constant mesh with a gear 33 on a countershaft 34. Rigidly secured to the countershaft is a second gear 35 which normally runs idle. Rigidly secured to the intermediate shaft 10 is a gear 36 which is normally idle and which may be moved into and out of mesh with the gear 35. The arrangement of the gear 36 on the shaft 10 is such that it will not mesh with the gear 35 until the gear 16 has been moved out of engagement with the teeth 15 of the tubular connecting member 14. It will be noted that the teeth 15 terminate some distance from the forward end of the tubular member so that the gear 16 may be moved out of engagement therewith without being withdrawn entirely from the tubular member. In this manner the shaft 10 is connected with the driven shaft through the multiplying gear train, this being accomplished by moving the lever 17 to a position near the rear end of the slot 22 of the guide plate 21.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a transmission mechanism, a housing, alined bearings at the respective ends of said housing, a driving shaft journaled in one of said bearings, a driven shaft journaled in the other of said bearings, a spur gear secured to said driving shaft, a supporting structure mounted in said housing for movement both longitudinally and transversely thereto, an intermediate shaft rotatably mounted on said supporting structure and movable therewith, means for connecting said intermediate shaft with said driven shaft for both axial movement and swinging movement with relation thereto, an internal gear unit carried by said supporting structure, rigidly secured to said intermediate shaft and having a plurality of toothed portions of different diameters, and an actuating lever pivotally mounted between its ends for movement about axes extending both longitudinally and transversely to said housing and having one end extending into said housing and operatively connected with said supporting structure.

2. In a transmission mechanism, a housing, alined bearings at the respective ends of said housing, a driving shaft journaled in one of said bearings, a driven shaft journaled in the other of said bearings, a spur gear secured to said driving shaft, said housing having guides arranged within the same and extending lengthwise thereof, a structure supported by said guides for movement both longitudinally and transversely with relation thereto and having a bearing, an intermediate shaft journaled in the bearing of said structure and movable with said structure, means for connecting said intermediate shaft with said driven shaft for axial and swinging movement with relation thereto, an internal gear unit rigidly secured to said shaft and having a plurality of toothed portions of different diameters, and means for moving said structure on said guides to cause a selected toothed portion of said gear unit to engage said spur gear.

3. In a transmission mechanism, a housing, a driving shaft journaled in one end of said housing, a driven shaft journaled in the other end of said housing, a spur gear secured to said driving shaft, parts carried by said housing to form longitudinal guideways at the opposite sides thereof, a supporting plate slidably mounted in said guides for both longitudinal and transverse movement with relation thereto, an intermediate shaft mounted on said supporting plate for both axial movement and transverse movement therewith, means for connecting said intermediate shaft with said driven shaft for both axial movement and swinging movement with relation thereto, a gear unit carried by said intermediate shaft and having a plurality of toothed portions of different diameters, and an actuating lever connected with said supporting plate to impart movement to said intermediate shaft and said gear unit and cause a selected toothed portion of said gear unit to engage said spur gear.

4. In a transmission mechanism, a driving shaft, a driven shaft, a spur gear connected with one of said shafts, an internal gear unit connected with the other of said shafts having a plurality of toothed portions of different diameters and capable of both axial movement and transverse movement to cause a selected toothed portion thereof to engage said spur gear, a brake shoe mounted adjacent to and adapted to be engaged by the outer circumferential portion of said gear unit, and means for actuating said gear unit to cause a selected toothed portion thereof to engage said spur gear or to move all of said toothed portions out of engagement with said spur gear and to move said outer circumferential portion into engagement with said brake shoe.

5. In a transmission mechanism, a driving shaft, a driven shaft, variable speed mechanism to connect said shafts one with the other and comprising an intermediate shaft capable of axial movement, means for normally connecting said intermediate shaft with said driven shaft and for interrupting said connection when said intermediate shaft is moved axially to a predetermined position, a countershaft having geared connection with said driven shaft, a gear carried by said countershaft, a gear carried by said intermediate shaft and so arranged that when said intermediate shaft is moved axially to disconnect the same from said driven shaft the last mentioned gear will be moved into mesh with the gear on said countershaft, and means for imparting axial movement to said intermediate shaft.

6. In a transmission mechanism, a driving shaft, a driven shaft, a spur gear secured to said driving shaft, a tubular member secured to said driven shaft and having internal teeth, an intermediate shaft extending into said tubular member, a clutch member carried by said intermediate shaft and movable into and out of engagement with the teeth of said member, an internal gear unit carried by said intermediate shaft and having a plurality of toothed portions any one of which may be moved into engagement with said spur gear, a gear rigidly secured to said driven shaft, a countershaft, a gear on said countershaft meshing with the gear on said driven shaft, a second gear on said countershaft, a gear on said intermediate shaft arranged to be moved into mesh with the second gear on said countershaft when the clutch member on said intermediate shaft is moved out of engagement with the teeth of said tubular member, and an actuating device for imparting both axial and transverse movement to said intermediate shaft.

In testimony whereof, I affix my signature hereto.

SAMUEL E. MORRAL.